May 7, 1929.  B. W. NORDLANDER  1,711,742
MERCURY VAPOR DETECTOR
Filed Jan. 21, 1926
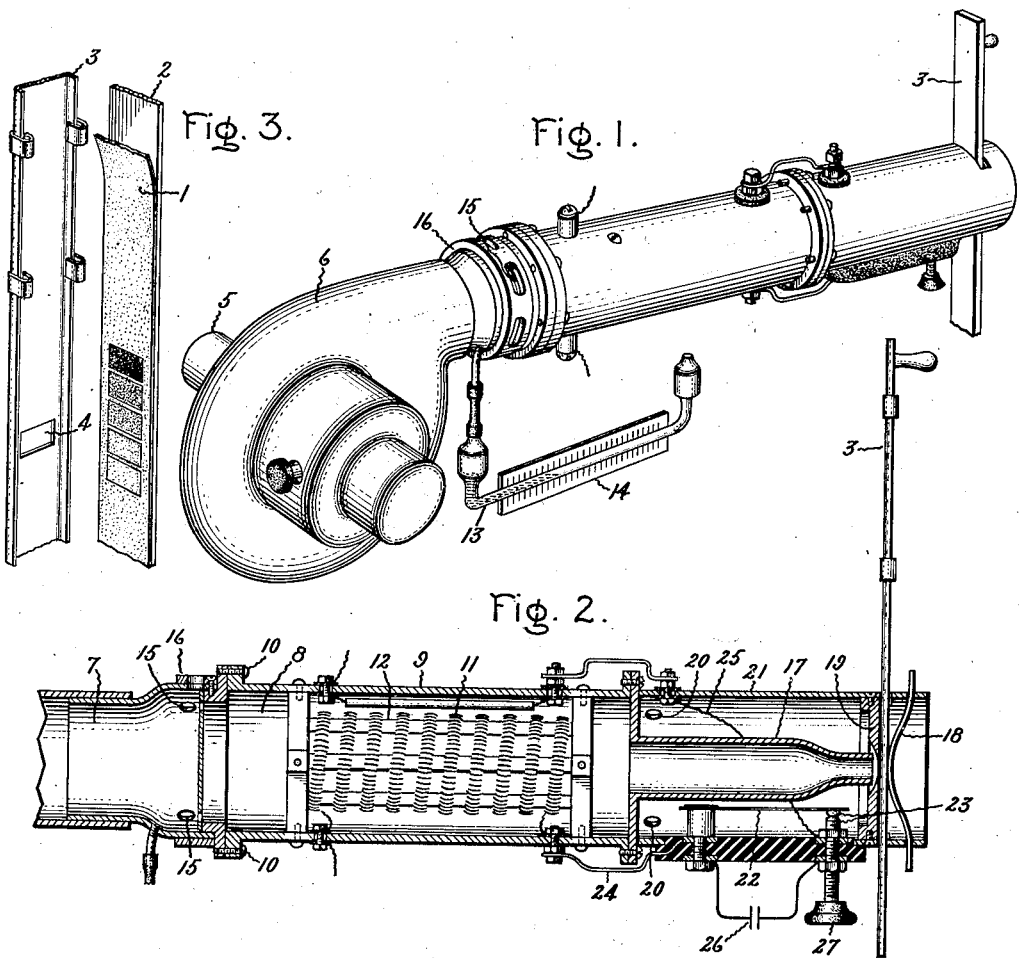
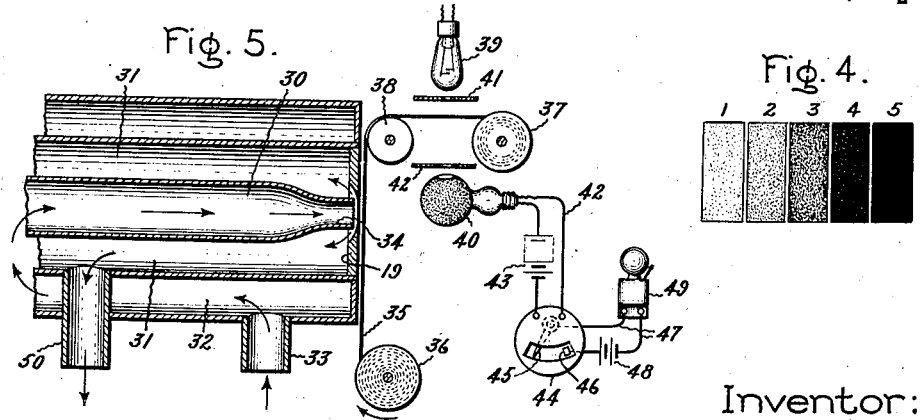
Inventor:
Birger W. Nordlander,
by His Attorney.

Patented May 7, 1929.

1,711,742

UNITED STATES PATENT OFFICE.

BIRGER W. NORDLANDER, OF SCHENECTADY, NEW YORK, ASSIGNOR TO GENERAL ELECTRIC COMPANY, A CORPORATION OF NEW YORK.

MERCURY-VAPOR DETECTOR.

Application filed January 21, 1926. Serial No. 82,883.

The present invention comprises a means for detecting mercury vapor in a gas, such as in the atmosphere, or in flue gas.

Now that mercury is being used in large industrial devices, as for example, in electric power rectifiers, in large turbines, for heating operations and in chemical processes, the need has arisen for detecting leakage of mercury vapor into the atmosphere in order to prevent mercury poisoning to operators and excessive losses of mercury.

In accordance with my invention, I have provided means for detecting mercury vapor in gas, also apparatus whereby amounts of mercury vapor as small as one part in many million of other gas may be measured with a high degree of accuracy. My invention includes a test medium for mercury vapor containing sulphur and selenium either combined or uncombined. My invention includes an apparatus for delivering the gas to be tested at a constant rate and at a predetermined elevated temperature to a sensitized film on which an intermittent or continuous record is made of the mercury content of the gas. A darkening of the sensitized film is caused by a chemical reaction of mercury with the sulphur and selenium to a degree depending on the concentration of the mercury in the air, or other gas, being tested. In accordance with one form of my invention a mechanism is provided for sounding an alarm when the content of mercury in the air becomes so high as to be dangerous.

My invention will be more completely understood by reference to the accompanying drawing in which Figs. 1 and 2 show respectively in perspective and in longitudinal section an apparatus embodying my invention; Fig. 3 shows a cassette and a film sensitive to mercury held thereby; Fig. 4 shows a comparison standard; and Fig. 5 illustrates in section a modification of one part of my apparatus and also diagrammatically indicates an alarm device.

In accordance with the preferred method of preparing a compound sensitive to mercury, the air is exhausted from a suitable reaction chamber which contains a quantity of pure water, and hydrogen sulphide gas is introduced. When some of this gas has become dissolved in the water, selenious acid, $H_2SeO_3$, is introduced drop by drop into the solution of hydrogen sulphide, accompanied by constant stirring of the solution. As the reaction goes on hydrogen sulphide is absorbed by the solution and a yellow flocculent precipitate of selenium sulphide, $SeS_2$, is produced. This reaction is continued until the desired amount of compound has been precipitated. The compound may be removed by filtration, and when dried the selenium sulphide thus prepared is in the form of a very fine powder which may be applied upon paper by rubbing.

When hydrogen sulphide is bubbled through a solution of selenious acid, the selenium sulphide is precipitated in a colloidal condition. It may be preserved in this state, by adding a protective colloid, such as gelatine, and applied as a paint upon paper or other suitable medium. Selenious acid may be acted upon by other soluble sulphides, such as sodium sulphide. When the colloidal form of selenium sulphide is produced in considerable quantities without adding any protective colloid, it accumulates in a rubbery mass which slowly hardens and in a hardened condition may be ground into powdered form. This form of the sulphide appears to contain some free selenium which renders it somewhat darker in color. I may also employ hydrogen selenide and sulphurous acid for the preparation of the mercury sensitive compound.

In accordance with another method of preparing the selenium sulphide, sulphur and selenium are melted together preferably in the proportions of one molecular weight of selenium to two molecular weights of sulphur, although other proportions may be used. A rubbery mass is produced by the fusion of selenium and sulphur which when hardened may be ground into powdered form and applied for the purpose of my invention.

In a copending application Serial No. 350,836, filed March 28, 1929, I have described and claimed selenium sulphide as a stable, chemically active compound and methods for its preparation.

When a strip of paper such as indicated in Fig. 3 is to be used for making successive tests of the content of mercury vapor of air, flue gas or the like, the test paper 1 preferably is mounted in a frame 2 which slidably engages with a similar frame 3 having a window 4 provided therein. These two frames together constitute a cassette or a holder which is adapted to be inserted in the testing apparatus as indicated in Fig. 1. Such an apparatus as shown in Figs. 1 and 2 constitute a means whereby the sensitized paper may be subjected to a current of the gas to be tested, delivered at a predetermined rate and at a predetermined temperature. This gas, which may be assumed to be air, is drawn from the place where the mercury content is to be determined by a conduit in part indicated at 5 and is delivered by a blower 6 into a conduit 7 which communicates with a heating chamber 8 within the tubular container 9. This container is joined to the conduit 7 by the screws 10 and contains an electric heater 11 supported upon a suitable framework 12 within the chamber 8. The velocity of the air delivered by the conduit 7 may be indicated in terms of pressure in the conduit 7 by a suitable manometer, such as the kerosene column within a tube 13, moving over a scale 14. The velocity of the air may be suitably regulated by adjusting the size of the openings 15 in the conduit 7 which register with openings in the regulating ring 16, thus allowing more or less of the air to escape. The heated air is delivered by a nozzle 17 to the exposed portion of the testing strip. As shown in Fig. 2, the cassette in which the test strip is mounted is held by means of a spring 18 into frictional contact with a diaphragm 19 which is provided with an opening registering with the end of the nozzle 17. The air to be tested thus is delivered to the exposed portion of the test paper and is discharged through holes 20 in the tube 21 into the open air. In this container 21 the air comes in contact with a thermostatic regulator 22. This regulator has contacts 23 connected in series with the heater circuit 24, 25 and shunted by a condenser 26. By suitable adjustment of the contacts 23 through the regulating screw 27, the thermostat may be set to open and close the heater circuit at such intervals that the air to be tested is maintained at a substantially constant and predetermined temperature.

In order to indicate the amount of mercury vapor, a scale is prepared as indicated in Fig. 4 constituted of a number of areas, only five of which have been shown in the drawing, the "color" or depth of darkening of which corresponds to different exposures made upon a standard test paper at a given temperature and given velocity for given length of time by a gas containing known concentrations of mercury vapor. In practice a large number of comparison standards may be used only five having been indicated in the drawing for illustrative purposes.

Supposing the gas to be tested to be heated to a given temperature and to be directed against an exposed part of the surface of the test paper at a given velocity for a given time, then the depth to which the exposed portion of the sensitized paper is darkened will indicate the quantity of mercury vapor in the gas being tested. Preferably, the paper, or other sensitized film, is warmed up to the temperature of the gas to be tested by moving the frame 3 up or down to a position protecting the surface of the paper to be exposed, directing the heated gas against the frame 3 and after a few minutes when the paper has been warmed up moving the frame to cause the gas to strike the warmed paper through the window 4.

If the darkening should correspond in depth to one of the areas 1—2—3—4—5, then the amount of mercury vapor is known. However, should the darkening be too light for area No. 1 on the scale, then the time of exposure may be doubled. As the darkening of the coating of selenium sulphide is directly proportional both to the time of exposure and the concentration of mercury in the gas being tested, it is possible to measure extremely small contents of mercury vapor. If the time required to produce a darkening equal to area No. 1 is four times the length required by the calibrating gas of known mercury content, then the concentration of mercury vapor in the unknown is one-fourth of that of the calibrating gas. A content of mercury vapor of one part in five million parts of air will produce a marked blackening of the sulphide layer in about four minutes, assuming the air current to be heated to about 70° C. and the velocity of the current to be kept at 1 meter per second.

At high concentrations the procedure is the same, but in reverse direction, that is, the time of exposure is decreased until the exposed area assumes a proper blackening within the range of the scale. One scale properly calibrated thus may be used for the testing gases having a wide range of concentrations of mercury.

In the modification of my apparatus which is illustrated in longitudinal section in Fig. 5, two additional features of my invention are shown which may be used independently of each other. The conduit 30 which delivers the gas to the window in the diaphragm 19 is surrounded by two gas chambers, namely 31, 32. The gas to be tested, which may be assumed to be flue gas suspected of containing mercury vapor, is conducted by the inlet tube 33 into outer chamber 32 from thence passes through a communication (not shown) to the conduit 30 as indicated by arrows, issues from the nozzle 34 and after impinging upon the indicating strip 35, escapes through the intermediate chamber 31 to an outlet 50. The conduit 30 should be provided with a thermostatic device which, in this case, has not been shown for the sake of simplicity in the drawing. This device may be of any of the approved types now used in the presence of heated gases which may have a corroding effect upon the vibrating contacts, the latter being situated in a separate chamber into which the gases do not penetrate. The gas received by the inlet tube 33 passes over a resistance heater which is controlled by the thermostat to maintain a desired temperature in the gas as already described in connection with the apparatus in Fig. 2. It will be noted that the gas in the conduit 30 is surrounded by a jacket through which the gas from the chamber escapes, thus maintaining more readily a constant temperature in the gas which is coming into contact with the compound which is sensitive to mercury vapor.

Fig. 5 shows another feature of my invention, namely an arrangement whereby a dangerous accumulation of mercury vapor in the air or the gas may be caused to automatically sound an alarm and also to give a visual indication at a remote point. The strip 35 which may consist of a film of transparent material treated with selenium sulphide is wound from the reel 36 upon the reel 37 passing over a guide 38. In its passage from the reel 36 to the reel 37 the sensitive band or film is darkened by contact with the gases impinging on it from the nozzle 34 to a degree dependent upon the mercury content of these gases. A beam of light is caused to pass from the lamp 39 through the film 35 to a photoelectric cell 40, suitable diaphragms 41, 42 being interposed. Variations in the opacity of successive portions of the strip 35 produces variations in the output circuit 42 of the cell. This circuit contains a source of current, as indicated diagrammatically by the battery 43, and an electric measuring device, such as the galvanometer 44. Amplification circuits may be used but have not been shown for the sake of rendering the illustration as simple as possible. The movement of the pointer 45 of this device gives visual indication at a remote point of the varying mercury content of the gas which is being tested. When the pointer 45 moves to an extreme position to the right and touches an electric contact 46, it will complete an alarm circuit 47 containing a battery 48 and an alarm device, such as the electric bell 49. With this apparatus a dangerously high content of mercury vapor will be evidenced by the ringing of the alarm signal and at the same time the film 35 will constitute a permanent record of the variations of the mercury content in the gas being tested.

What I claim as new and desire to secure by Letters Patent of the United States is:

1. A test medium for traces of mercury vapor comprising a flexible strip having a film of a compound of selenium and sulphur.

2. A flexible strip material sensitized with sulphide of selenium for detecting traces of mercury vapor.

3. A test paper provided with a film of selenium sulphide.

4. An apparatus for indicating the presence of mercury vapor in a gas, comprising the combination of means whereby a current of the gas to be tested may be delivered at a predetermined velocity and temperature, a light-transmitting strip material coated with a layer containing sulphur and selenium as constituents, means for linearly passing said strip material into contact with said current of gas, and means for indicating the relative opacity of successive portions of said material.

5. The method of indicating the presence of mercury vapor in a gas, which consists in conducting a predetermined quantity of said gas while heated into contact with a compound of selenium and sulphur.

6. The method of indicating the presence of mercury vapor in a gas, which comprises exposing a light transmitting strip of material coated with a layer containing sulphur and selenium as constituents to a current of gas having a predetermined velocity and temperature, passing said strip through the gas and directing light through the strip on to a light sensitive means whereby variations in the color of said strip may produce corresponding variations in the current through the light sensitive means.

7. The method of indicating the presence of mercury vapor in a gas which consists in bringing said gas into contact with a composition of selenium and sulphur which is capable of being darkened by mercury.

8. The method of indicating the presence of physiologically harmful amounts of mercury vapor in the air which consists in directing a stream of air to be tested into contact with a film of finely divided composition of selenium and sulphur which is capable of being darkened by mercury.

9. An apparatus for indicating the presence of a physiologically harmful amount of mercury vapor in air which comprises the combination of a conduit having an aperture, means whereby a current of air to be tested may be delivered through the aperture of said conduit, a light-transmitting medium sensitized with a composition of sulphur and selenium which is darkened by mercury positioned to be exposed to said current of air, light-sensitive means operatively positioned to receive light transmitted by said medium, and an alarm device arranged to be actuated by said means when light transmitted by said medium has decreased to a value predetermined to correspond to the presence of a harmful content of mercury vapor.

In witness whereof, I have hereunto set my hand this 20th day of January, 1926.

BIRGER W. NORDLANDER.